United States Patent
Rasmussen

[11] Patent Number: 5,430,588
[45] Date of Patent: Jul. 4, 1995

[54] METHOD AND APPARATUS FOR LATCHING AN ACCESS DOOR OF A MAGAZINE LOADING TAPE DRIVE

[75] Inventor: Donald Rasmussen, Arcadia, Calif.
[73] Assignee: WangDAT, Inc., Irvine, Calif.
[21] Appl. No.: 330,224
[22] Filed: Oct. 27, 1994

Related U.S. Application Data

[63] Continuation of Ser. No. 23,025, Feb. 25, 1993, abandoned.

[51] Int. Cl.⁶ .................... G11B 33/00; G11B 15/675
[52] U.S. Cl. ...................................... 360/96.5; 360/92; 242/338.4
[58] Field of Search .......... 360/96.5, 96.6, 92, 360/137, 99.02, 99.06, 98.04; 292/157, 144; 369/77.1, 77.2, 36; 242/338.4

[56] References Cited

U.S. PATENT DOCUMENTS

| | | | |
|---|---|---|---|
| 4,628,383 | 12/1986 | Miyamoto | 360/96.5 |
| 4,635,147 | 1/1987 | Durand et al. | 360/96.5 |
| 4,752,048 | 6/1988 | Paik | 360/96.5 |
| 4,795,109 | 1/1989 | Chung et al. | 360/96.5 |
| 5,040,162 | 8/1991 | De Rozrieux et al. | 369/75.1 |
| 5,243,478 | 9/1993 | Kawakami et al. | 360/96.5 |

FOREIGN PATENT DOCUMENTS

| | | | |
|---|---|---|---|
| 61-206992 | 9/1986 | Japan | 360/96.5 |
| 63-112890 | 5/1988 | Japan | 360/96.5 |
| 9115846 | 10/1991 | WIPO | 360/96.5 |

*Primary Examiner*—John H. Wolff
*Assistant Examiner*—Craig A. Renner
*Attorney, Agent, or Firm*—Robbins, Berliner & Carson

[57] ABSTRACT

A mechanical interlocking is provided between a bidirectional swinging access door with a moveable part of a tape cassette or magazine loading mechanism such that the door remains unlatched as the moveable part moves from its forward loading/unloading position to its rearward operational position and the door remains latched as the moveable part moves in the forward direction from its operational position to its loading/unloading position.

2 Claims, 3 Drawing Sheets

METHOD AND APPARATUS FOR LATCHING AN ACCESS DOOR OF A MAGAZINE LOADING TAPE DRIVE

CROSS REFERENCE TO RELATED APPLICATIONS

This is a continuation of application Ser. No. 08/023,025 filed 25 Feb. 1993, now abandoned.

TECHNICAL FIELD

The invention relates generally to a magazine-loading tape drive for storing digital data and more particularly to a method and apparatus for keeping an access door unlatched until a magazine has been loaded into the drive and then keeping the access door latched until the magazine is about to exit the drive.

BACKGROUND ART

Commonly assigned U.S. Pat. No. 5,089,920 discloses and claims a novel tape drive assembly that uses DAT (Digital Audio Tape) format cassettes and a high density DAT drive assembly, in which a plurality of cassettes are stored in a cassette tray located in a magazine holding area below the drive assembly, and a transport mechanism loads and unloads a selected cassette between the tray and the tape drive. In the known drive assembly, a front bezel is provided with two openings an upper door through which single cassettes may be individually loaded and unloaded into the tape drive, and a lower door through which an ordered sequence of cassettes stored in a cassette tray may be loaded and unloaded into the magazine holding area below the tape drive.

Commonly assigned copending application Ser. No. 07/953,639, filed Sep. 29, 1992 (Bjordahl) describes and claims an improved front panel for a magazine-loading DAT drive assembly having access doors which are normally positively biased to a closed position, but are inwardly deflected to a loading position as the cassette or magazine is being manually inserted into the drive assembly behind the panel and which are outwardly deflected to an unloading position as the cassette or magazine is being ejected from the drive assembly to a position from which they may be manually removed.

The access doors of the prior art loading mechanisms are subject to jamming and possible injury to an operator if opened inwardly during certain critical portions of the unloading cycle. Accordingly, it is conventional to provide a door operating and/or latching mechanism to ensure that the door is maintained in a jam-free position during the unloading cycle. However, the known latching mechanisms are not adapted for use with a bidirectional swinging access door which needs to be free to swing outwardly once the loading mechanism advances from its operational position inside the drive to a loading/unloading position adjacent the swinging door, and which also needs to be free to swing inwardly to receive a new cassette or magazine once the loading mechanism has reached the loading/unloading position and as it returns back to its operational position.

SUMMARY OF THE INVENTION

Accordingly, it is an overall object of the present invention to avoid the limitations of the prior art by interlocking a bidirectional access door with a moveable part of a tape cassette or magazine loading mechanism such that the door remains unlatched as the moveable part moves from its forward position to its rearward position and the door remains latched as the moveable part moves from its rearward position to its forward position.

In a preferred embodiment, the door is a bidirectional swinging door and the interlock is provided by a mechanical interlock mechanism which includes a latching arm which has a latching tab moveable from a latching position behind the door to an unlatched position at the edge of the door, a guide slot defined in a lateral surface of the latching arm, an actuator arm which is attached to the moveable part of the loading mechanism and which has a free end which extends in the direction of the guide slot, the free end entering the guide slot when the loading mechanism reaches its rearward operational position and remaining in the slot as the loading mechanism travels in a forward direction, the free end leaving the guide slot and the latching tab being moved to its unlatched position when the loading mechanism reaches its forward loading/unloading position and remaining outside the slot as the loading mechanism travels in a rearward direction.

DETAILED DESCRIPTION OF A PREFERRED EMBODIMENT

Figure 1:
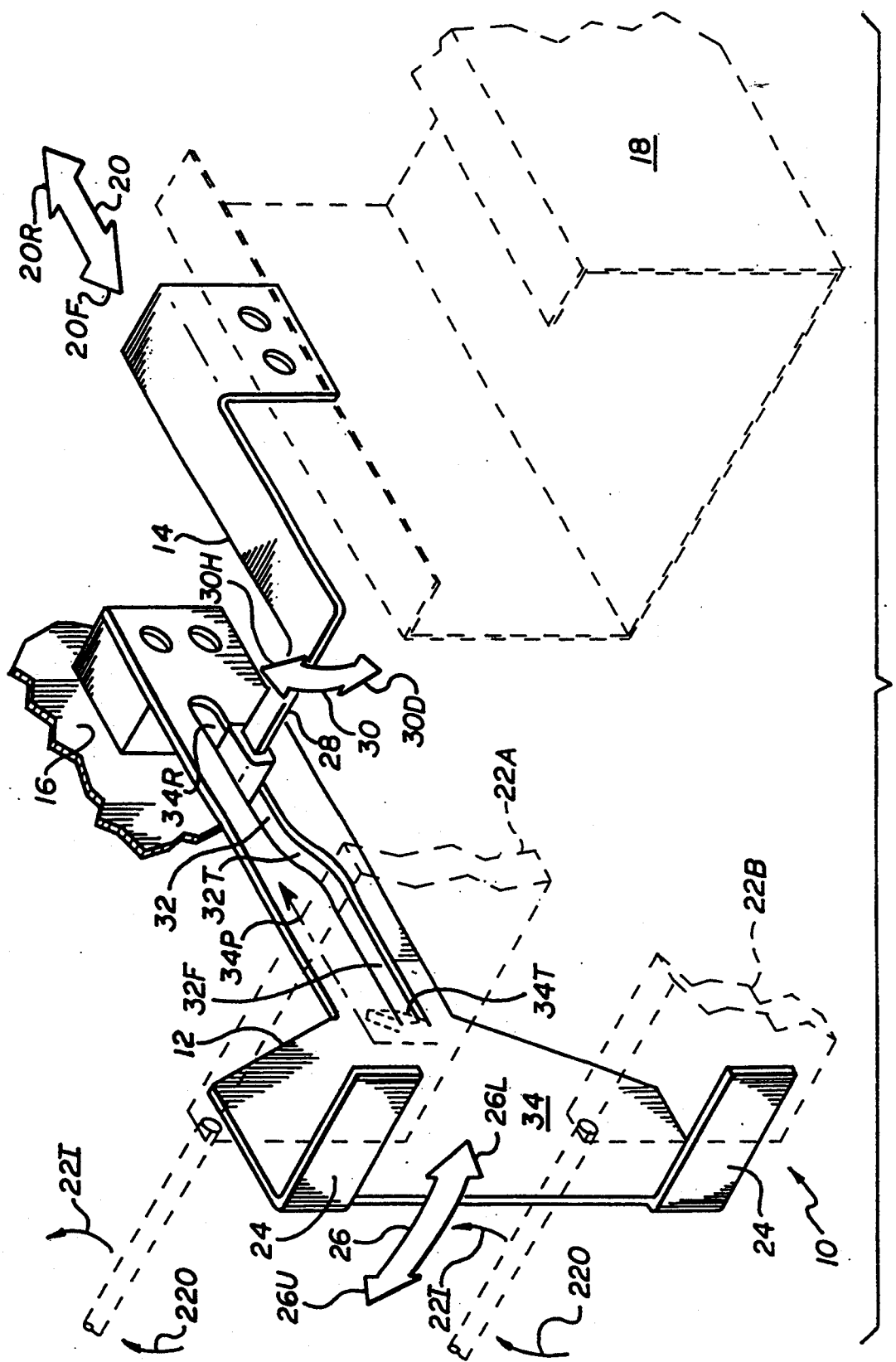
FIG. 1 is an isometric drawing showing an interlock mechanism constructed in accordance with the teachings of the present invention.

Referring now to FIG. 1, mechanical interlock 10 comprises two principal components: latch arm 12 and actuator arm 14. Latch arm 12 is attached to chassis 16 and actuator arm 14 is attached to moving part 18, which may for example be a carrier of a conventional cassette or magazine loading mechanism (not shown) such as is disclosed in the previously referenced patent, and which travels along a longitudinal axis 20 from a rearward operational position 20R away from a pair of bidirectional (ie, inwardly 22I and outwardly 22O) swinging access doors 22A, 22B to a forward loading position 20F adjacent bidirectional swinging access doors 22A, 22B. Latch arm 12 is formed from a thin sheet material such as stainless steel. Latch arm 12 is sufficiently flexible that when rigidly attached at one end to chassis 16, tab 24 at the other end is free to move along first transverse axis 26 between a latched position 26L and an unlatched position 26U, with latching tab 24 biassed by the inherent elasticity of the stainless steel material to latched position 26L. Actuator arm 14 is similarly formed, such that free end 28 is free to move along second transverse axis 30 between home position 30H and deflected position 30D, and is biassed by the inherent elasticity of the material to home position 30H.

As shown in FIG. 1, when moving part 18 is in its rearward operational position 2OR, latch arm 12 is biassed to its latched position 26L, and actuator arm 14 is biassed to its home position 30H, free end 28 of actuator arm 14 extends into rear guide portion 32R of guide slot 32 defined in lateral surface 34 of latch arm 12. As moving part 18 advances towards forward loading position 2OF, free end 28 is deflected downwards by intermediate traverse portion 32T and front guide portion 32F to deflected position 30D, until it reaches orthogonal traverse 34T which functions as a transition between front guide portion 32F and return path 34P defined on lateral surface 34 of latch arm 12. At this point moving part 18 is almost fully advanced towards its forward loading position 20F and free end 28 pushes against lateral surface 34 and deflects latch arm 12 to its unlatched position 26U. Being no longer restrained by front guide portion 32F, free end 28 returns to its home position 30H and remains in contact with lateral surface 34, on which it traces return path 34P until moving part 18 has almost reached rearward operational position 20R and free end 28 has been guided by intermediate traverse portion 32T back into rear guide portion 32R of guide slot 32, in which it remains until the foregoing cycle is repeated.

Figure 2:
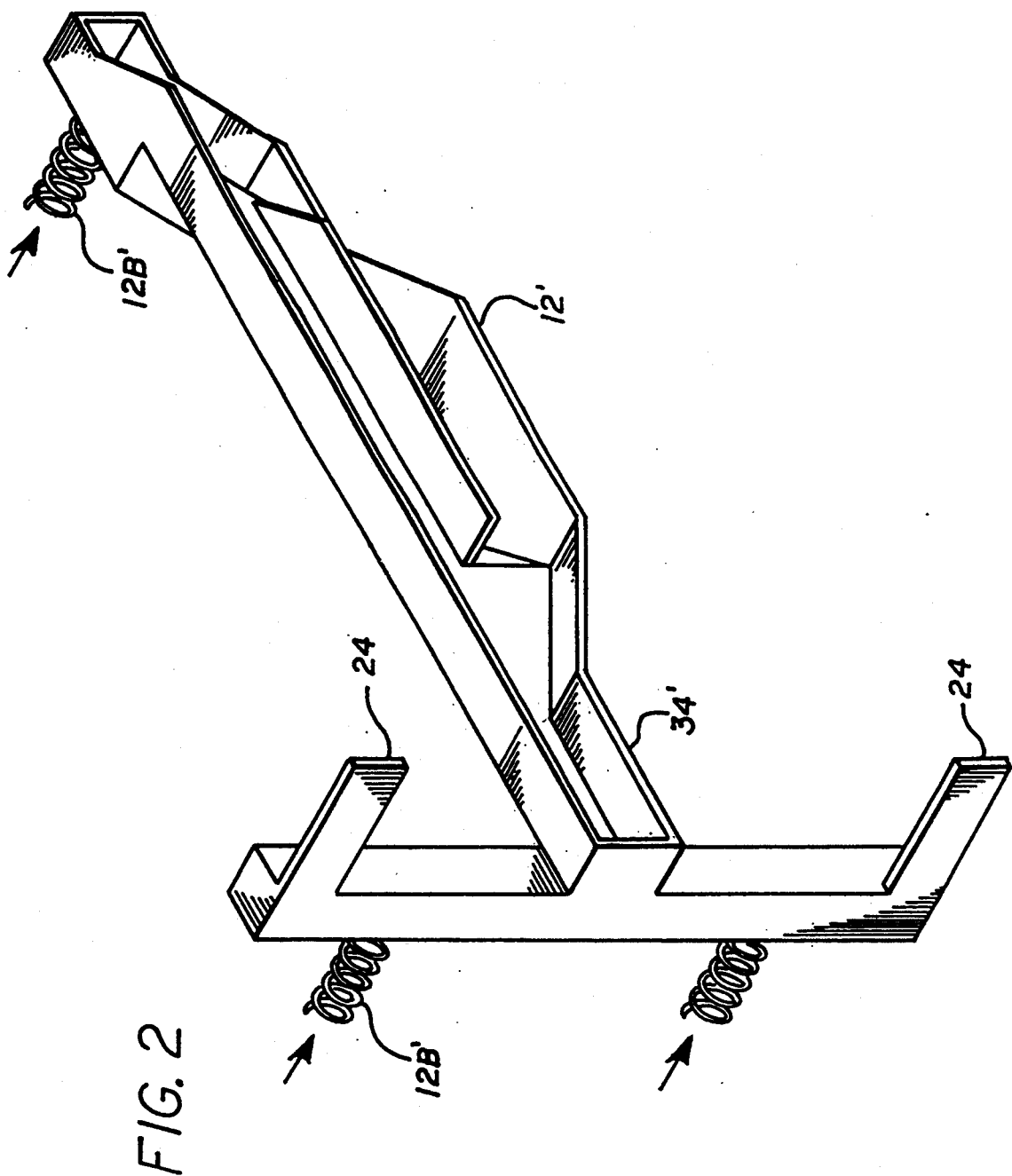
FIG. 2 shows an alternate embodiment of the latch arm portion of FIG. 1.
Figure 3:
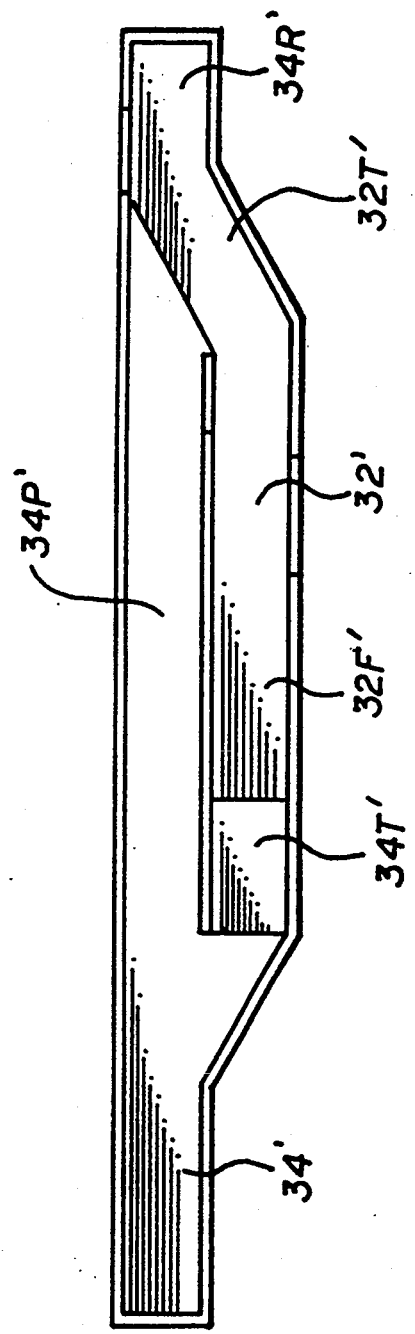
FIG. 3 is a side elevation view of the track portion of FIG. 2.

Referring now to FIGS. 2 and 3, which show an alternate embodiment of the latch arm 12 of FIG. 1, it will be seen that rather than forming the latch arm 12 and its attachment to chassis 16 as a single flexible component, it may be molded as a rigid plastic part 12' flexibly mounted to chassis 16 by means of one or more mounting springs 12B'. As seen from the direction of free end 28 of actuator arm 14, rigid molded part 12' defines a lower level 32' and an upper level 34' which are connected to the rear of front portion 32F' by ramp 34T' and to the front of rear portion 32R' by intermediate portion 32T' and by edge 34P' 32T' thereby defining a three dimensional track for the actuator arm 14 that is functionally equivalent to the guide slot 32, lateral surface 34, orthogonal traverse 34T, intermediate traverse portion 32T return path 34P, and rear guide portion 32R.

What is claimed is:

1. A method for cyclically unlatching a bi-directional swinging door, which covers an opening in a chassis, during the loading or unloading of a cassette or magazine into a moveable part and for latching the door when the moveable part reaches a rearward position within the chassis away from the door, the method comprising the steps of:

positioning the moveable part to a forward position adjacent to the opening;

opening the door into the interior of the chassis during the loading of the cassette or magazine onto the moveable part;

moving the cassette or magazine together with the moveable part toward the rearward position and closing the door;

latching the door by positioning a latching tab between the door and the cassette or magazine as the moveable part reaches the rearward position during a loading operation;

unlatching the door by biasing the latching tab to an unlatched position at an edge of the door as the moveable part moves toward the forward position such that the unlataching of the door during an unloading operation occurs when the moveable part is closer to said forward position than when the latching of the door occurs; and ejecting the cassette or magazine from the moveable part thereby opening the door outwards from the chassis.

2. A method for operating a cassette or magazine loading tape drive assembly including a bi-directional swinging door which covers an opening in a chassis containing a moveable loading mechanism for loading and unloading the cassette or magazine, and a latching mechanism for latching the door, the method comprising the cyclical steps of:

advancing a moveable part of the loading mechanism towards a forward position adjacent the opening;

as soon as the moveable part has thus been advanced past a first position to the rear of said forward position, unlatching the door by biasing a latching tab of the latching mechanism to an unlatched position at an edge of the door;

after the door has thus been unlatched, ejecting any previously loaded cassette or magazine already on the moveable part towards said door and through the opening such that the thus ejected cassette or magazine simultaneously causes said door to swing outwardly from the chassis;

after the door has thus been unlatched and any previously loaded cassette or magazine has thus been ejected but before the moveable part has been retracted behind said first position, opening the door inwardly into the interior of the chassis and simultaneously inserting another cassette or magazine through the opening onto the moveable part;

after the moveable part has thus been loaded, retracting the loaded moveable part towards a rearward position behind said first position;

after the loaded moveable part has been at least partially thus retracted to a second position behind said first position but in front of said rearward position, latching the door by allowing the latching tab to return to said latching position, whereby once the moveable part of the loading mechanism has been advanced to its forward position adjacent the opening and any previously loaded cassette or magazine has been ejected, said door is free to swing inwardly for receiving a new cassette or magazine through said opening, the door remains free to swing inwardly while the moveable part is being retracted rearwardly towards its rearward position inside the chassis, once the moving part has been retracted to its rearward position, the door is latched in a closed position, the door remains latched in said closed position while the moveable part is again advanced towards its forward position, and once the moveable part has been again advanced to its forward position, the door is again unlatched and free to swing outwardly to permit the ejection of any previously loaded cassette or magazine through the opening.

* * * * *